(12) United States Patent
Shiraishi (10) Patent No.: US 7,014,320 B2
(45) Date of Patent: Mar. 21, 2006

(54) PROJECTION TYPE DISPLAY DEVICE

(75) Inventor: Mikio Shiraishi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/803,407

(22) Filed: Mar. 17, 2004

(65) Prior Publication Data
US 2004/0246447 A1 Dec. 9, 2004

(30) Foreign Application Priority Data
Jun. 5, 2003 (JP) ............................. 2003-160172

(51) Int. Cl.
*G03B 21/18* (2006.01)
*G03B 21/16* (2006.01)
*G02F 1/1333* (2006.01)
*H04N 5/74* (2006.01)
*F21V 29/00* (2006.01)

(52) U.S. Cl. ........................... 353/57; 353/60; 353/61; 349/161; 348/748; 362/294

(58) Field of Classification Search .................. 353/58, 353/31, 34, 52, 57, 60, 61, 122, 119, 33; 349/5, 58, 161; 359/512; 362/218, 294, 362/373, 547, 580; 348/748
See application file for complete search history.

(56) References Cited

U.S. PATENT DOCUMENTS

| | | | | |
|---|---|---|---|---|
| 6,072,458 A | * | 6/2000 | Asakawa et al. | 345/101 |
| 6,152,699 A | * | 11/2000 | Shikata et al. | 417/12 |
| 6,280,038 B1 | * | 8/2001 | Fuse et al. | 353/57 |
| 2002/0008852 A1 | * | 1/2002 | Onishi et al. | 353/57 |

FOREIGN PATENT DOCUMENTS

| | | |
|---|---|---|
| JP | 09-319007 | 12/1997 |
| JP | 2000-137291 | 5/2000 |
| JP | 2001-185884 | 7/2001 |

* cited by examiner

*Primary Examiner*—W. B. Perkey
*Assistant Examiner*—Rochelle Blackman
(74) *Attorney, Agent, or Firm*—Townsend and Townsend and Crew LLP

(57) ABSTRACT

There is a need for allowing an exhaust direction of a cooling air to be appropriately changed according to an installation environment of a projection type display device. There is another need to achieve a system for preventing an intake air and an exhaust air from being circulated therebetween by changing the direction of an intake port as well as an exhaust direction. A cooling system for an area around a lamp that accounts for a good part of an amount of heat generated by the projection type display device is isolated from a cooling system for other parts including a liquid crystal panel. Means is further provided of allowing the directions of intake and exhaust to be inverted in an entire device by changing the direction of rotation of an exhaust fan provided for the cooling system for the area around the lamp between forward and backward.

8 Claims, 8 Drawing Sheets

PROJECTION TYPE DISPLAY DEVICE

BACKGROUND OF THE INVENTION

The present invention relates to a projection type display device projecting an image onto a screen by using a light valve element such as a liquid crystal panel or the like. Examples of industrial applications of such a device include a liquid crystal projection type display device, a liquid crystal television set, and a projection type display device.

Conventionally known is a projection type projector, such as a liquid crystal projector or the like. The projector projects an image in an enlarged scale onto a screen by changing light from an electric bulb or other light source into a specific shade of gray for each pixel using a light valve element such as a liquid crystal panel.

The conventional projection type display device works as follows. An optical modulator as light valve means modulates light from a lamp as a light source of illuminating means. Projecting means then projects the light onto a screen or the like to display the same as an image. In a projection type display device of this type, it is common practice to provide cooling means for exhausting out of the unit components of heat generated from sources other than a light output produced by the lamp as the illuminating means. In the meantime, the optical modulator as the light valve means absorbs unwanted light or otherwise generates heat when the modulator converts the light through modulation to a corresponding image. It is known that failure, at this time, to provide temperature control for the optical modulator results in the life of the modulator being shortened. It is therefore common practice also to provide cooling means for the light valve element.

Prior art approaches toward an exhaust direction in such a projection type display device are disclosed, for example, in Japanese Patent Laid-open No. Hei 9-319007, Japanese Patent Laid-open No. 2000-137291, and Japanese Patent Laid-open No. 2001-185884.

The prior art disclosed in Japanese Patent Laid-open No. Hei 9-319007 has the following arrangement. Specifically, a flexible duct is provided at an exhaust port of the projection type display device and the direction of the duct is changed as necessary. Such an arrangement allows the exhaust direction to be appropriately varied according to environmental conditions at an installation site. The need to vary the exhaust direction in response to the installation site environment is thus satisfied.

The prior art disclosed in Japanese Patent Laid-open No. 2000-137291 provides an arrangement that allows the exhaust direction to be appropriately changed. Specifically, a directing direction of an exhaust guide (louver) provided at an exhaust port is appropriately changed to direct an exhaust heat in either an upward or a downward direction, or a rightward or a leftward direction. Such an arrangement allows the exhaust direction to an outside of the unit to be appropriately varied. The need to vary the exhaust direction in response to the installation site environment is thus satisfied to a degree.

The prior art disclosed in Japanese Patent Laid-open No. 2001-185884 provides the following arrangement. Specifically, a plurality of exhaust ports facing in different directions are provided. A sensor mounted in each of the plurality of exhaust ports detects a plugged port. Different exhaust ports are used so as to avoid the plugged port or ports. Such an arrangement meets the need to vary the exhaust direction in response to the installation site environment.

SUMMARY OF THE INVENTION

Japanese Patent Laid-open No. Hei 9-319007 lacks in consideration for minute details as follows. Specifically, an intake port of cooling air can be disposed in close vicinity to an exhaust port depending on an arrangement. In such a case, an exhaust heat is drawn back into the unit. This presents a new problem of a degraded cooling capacity. It is also clumsy to handle the duct added to the outside of the unit. In particular, the duct makes it inconvenient to carry the unit. The duct can also be extremely hot to touch when the unit is handled.

Japanese Patent Laid-open No. 2000-137291 lacks in consideration for minute details as follows. For example, the exhaust port provided on a side face of the unit does change the exhaust direction vertically and horizontally. The exhaust port does not, however, direct the exhaust either entirely forward or entirely rearward.

Japanese Patent Laid-open No. 2001-185884 lacks in consideration for minute details as follows. Specifically, an intake port of cooling air can be disposed in close vicinity to an exhaust port depending on an arrangement. In such a case, an exhaust heat is drawn back into the unit. This presents a new problem of a degraded cooling capacity. An increased space is required for accommodating the plurality of exhaust ports, moving the position of an exhaust fan as exhaust direction changing means, and disposing a plurality of exhaust fans. This in turn results in the size and weight of the entire unit being increased.

The following aspects of the exhaust involved with cooling of the projection type display device must be taken into consideration. First, assume a condition, in which a high-temperature exhaust is to be discharged in the direction of a back face or a side face of the unit relative to a projecting direction of the unit. In this case, the hot air is directed toward, for example, persons attending a meeting in a meeting room, in which the display unit is installed. Second, assume a case, in which the exhaust is directed toward the front of the unit in the same direction as the projecting direction. In this case, flicker can occur in the projected image as caused by air density of the exhaust and a difference in temperature between the exhaust and an ambient air depending on the room temperature. It is therefore necessary to change the exhaust direction to an optimum one best suited to the ambience of the installation site.

As described in the foregoing, careful consideration has not been given in the prior art to make the following aspects compatible with each other. For one thing, an arrangement is made to change the exhaust direction as appropriately in accordance with the ambience of the installation site. For another, the intake port and the exhaust port are separated sufficiently from each other so that the exhaust is not diverted toward the intake side.

It is therefore an object of the present invention to provide a projection type display device that allows the exhaust direction to be changed as appropriately in accordance with the ambience of the installation site and, if the exhaust direction is changed, reduces the chance of the exhaust circulating toward the intake side.

To achieve the foregoing object, the present invention provides a projection type display device provided with the following components. The components include, specifically, a light source unit; a first cooling fan for cooling the light source unit; a light valve modulating a flux of light emanated from the light source unit; a second cooling fan for cooling the light valve; and a projection lens projecting light modulated by the light valve. The projection type display device is characterized in that a first cooling air path produced by the first cooling fan and a second-cooling air path produced by the second cooling fan are formed substantially independently of each other. The display device is characteristically arranged so that a blowing direction of a first cooling air generated by the first cooling fan is selectively varied.

DETAILED DESCRIPTION OF THE PREFERRED EMBODIMENTS

Preferred embodiments according to the present invention will be described with reference to the accompanying drawings. Like reference numerals have been used in all drawings to denote like parts having like functions. To avoid complication, explanations given once will not be repeated.

FIGS. 1 through 6 are explanatory drawings of the first embodiment of the present invention. Explanations will be given in order of figure numbers.

Figure 1A:
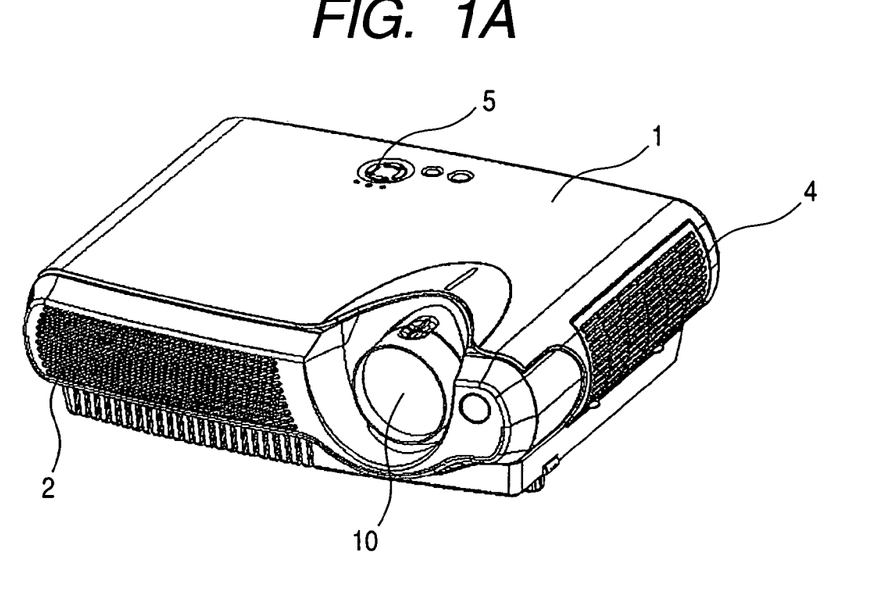
FIGS. 1A and 1B are perspective views of external representations of a projection type display device according to a first embodiment of the present invention.
Figure 1B:
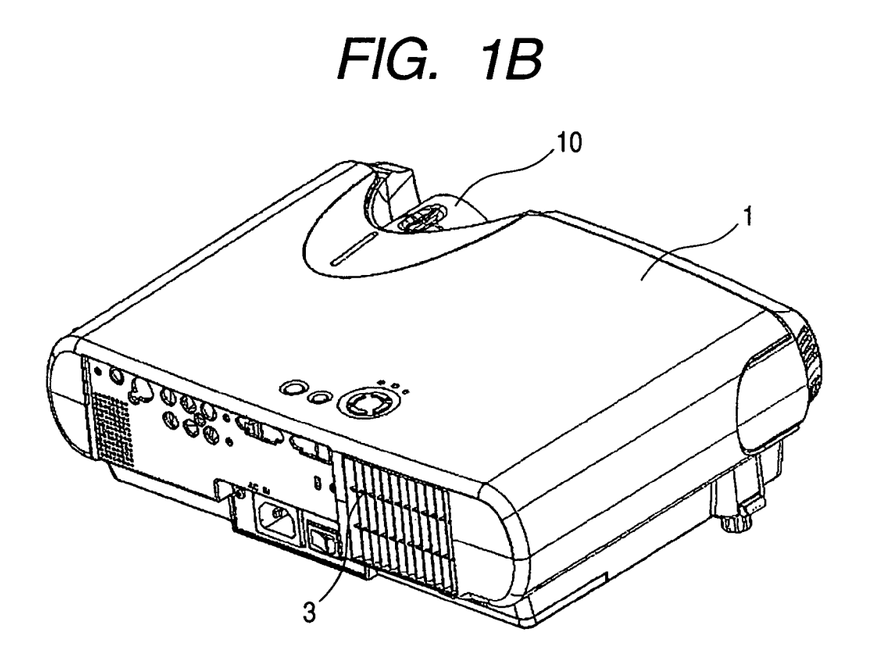

FIGS. 1A and 1B are perspective views of external representations of a projection type display device according to a first embodiment of the present invention. FIG. 1A shows a front side of a projection type display device 1. FIG. 1B shows a rear side of the projection type display device 1.

Referring to FIGS. 1A and 1B, the projection type display device 1 in accordance with the first embodiment of the present invention is constructed as follows. Referring specifically to FIG. 1A, an intake/exhaust port A 2 is provided in the same direction as a projection lens 10, that is, on a front side of the display device 1. Referring specifically to FIG. 1B, an intake/exhaust port B 3 is provided on a backside of the display device 1. In addition, an operation switch 5 (to be described later), a panel intake port 4, and the like are disposed on an outside of the display device 1.

Figure 2:
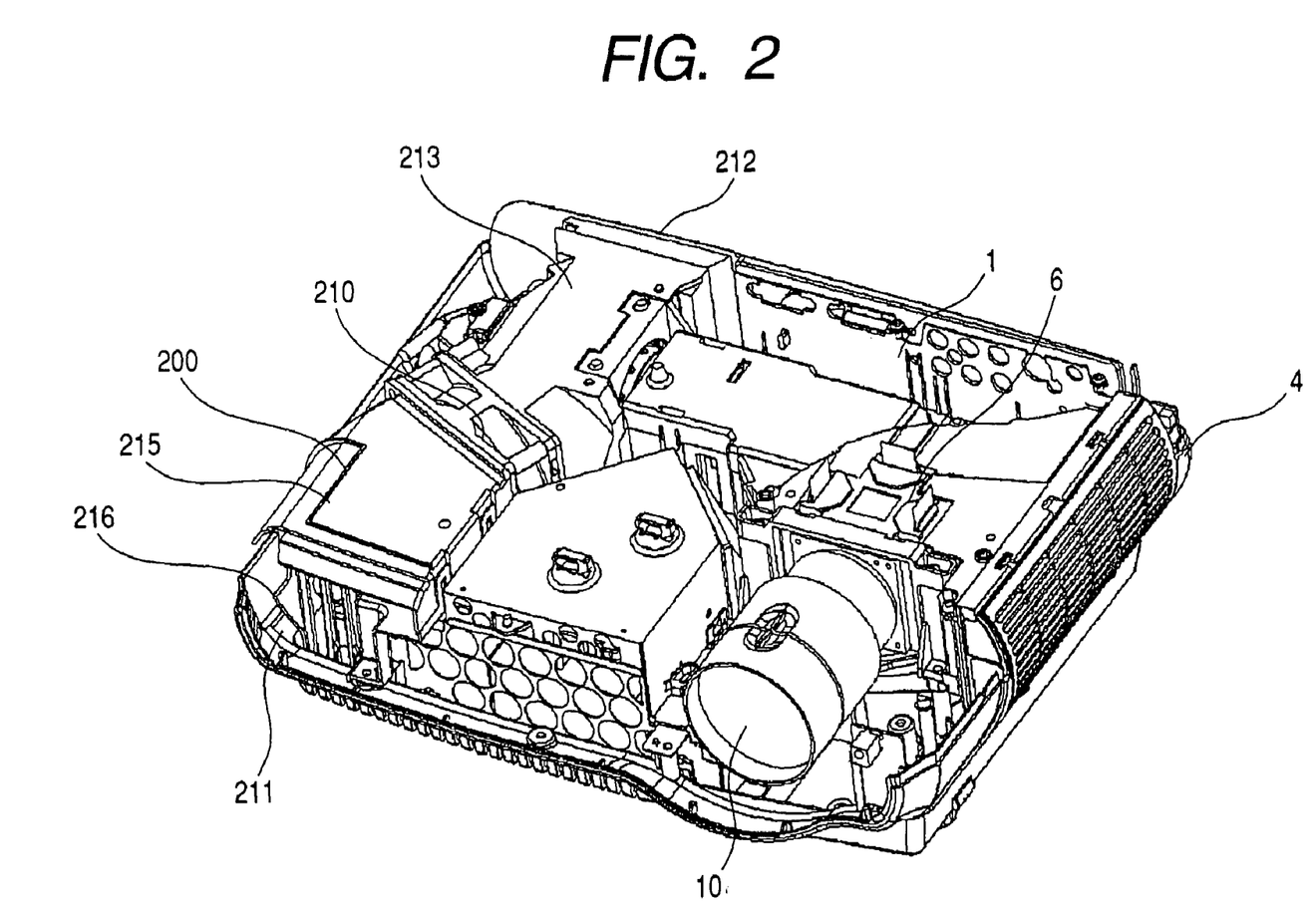
FIG. 2 is a perspective view showing an internal construction of the projection type display device according to the first embodiment of the present invention.

FIG. 2 is a perspective view showing an internal construction of the projection type display device 1 shown in FIGS. 1A and 1B according to the first embodiment of the present invention.

Referring to FIG. 2, a lamp cooling duct 200 serving as cooling means for a lamp (a light source unit) as illuminating means is provided on an inside of the display device 1. The lamp cooling duct 200 includes an intake/exhaust duct U 215 and an intake/exhaust duct B 216 that are disposed in an opposite side from a lamp duct 213 so as to sandwich a fan 210 therebetween. In addition, a duct intake/exhaust port A 211 and a duct intake/exhaust port B 212 are provided on both ends of the lamp cooling duct 200.

There is a lamp or the illuminating means provided on an underside of, and hidden behind, the lamp duct 213 of the lamp cooling duct 200. The projection type display device 1 operates schematically as follows. Namely, light emitted from the lamp as the illuminating means is modulated by light valve means shown as reference sign 999 in FIGS. 4A and 4B, for example, provided on an inside of an optical engine portion 6. The light then travels through the projection lens 10 as the projecting means before being projected as an image onto a screen (not shown) or the like on an outside of the display device 1.

The optical engine portion 6 includes the following components. The components specifically includes: an illuminating optical system (not shown) irradiating the light valve means (999 in FIGS. 4A and 4B) with light emitted from the lamp (not shown) as the illuminating means; the light valve means (999 in FIGS. 4A and 4B) forming an optical image by carrying out optical intensity modulation, in which the light irradiated by the illuminating optical system is converted to a corresponding shade of gray of light for each pixel according to an image signal; and the projection lens 10 as the projecting means projecting the optical image in an enlarged scale. In FIG. 2, the optical engine portion 6 uses three liquid crystal panels as the light valve means.

Figure 3:
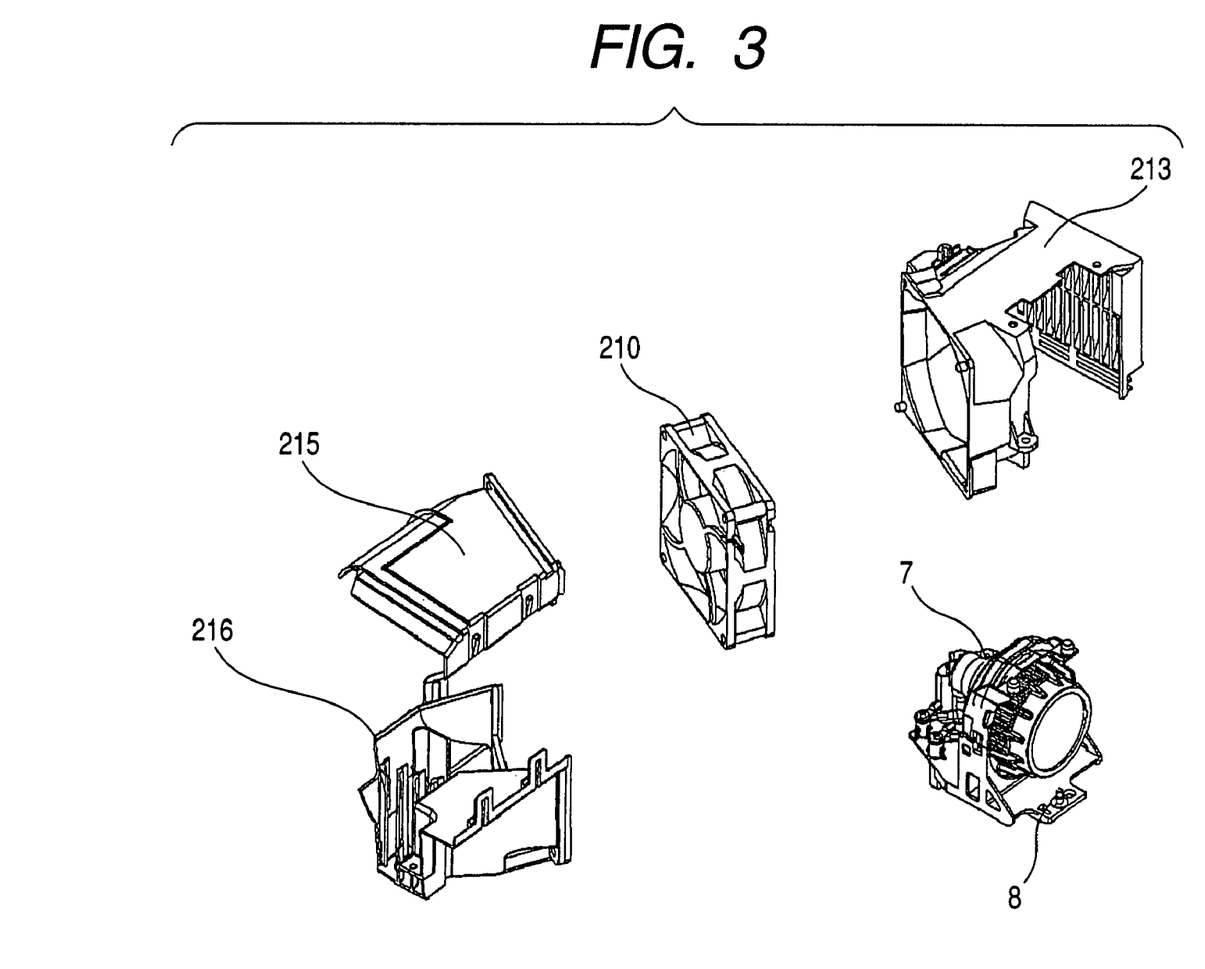
FIG. 3 is a perspective view showing the construction of a lamp cooling duct of the projection type display device according to the first embodiment of the present invention.

FIG. 3 is an exploded view showing components of the lamp cooling duct 200 of the projection type display device 1 according to the first embodiment of the present invention shown in FIG. 2.

Referring to FIG. 3, the lamp duct 213 is disposed adjacently the fan 210 on the side of the lamp in the lamp cooling duct 200. The lamp 7 mounted on a lamp holder 8 is accommodated inside the lamp duct 213, forming the illuminating means. The duct intake/exhaust port B 212 forms an outside of the lamp duct 213. Provided on the opposite side of the fan 210 are the intake/exhaust duct U 215 and the intake/exhaust duct B 216 forming an intake/exhaust duct. Portions facing the outside of the display device 1 of these two components form the duct intake/exhaust port A 211.

Referring to FIGS. 2 and 3, the duct intake/exhaust port A 211 on one end of the lamp cooling duct 200 is connected to an intake/exhaust port A 2 serving as an inlet/outlet of air from the outside of the display device 1. The duct intake/exhaust port B 212 on the other end of the lamp cooling duct 200 is connected to an intake/exhaust port B 3 serving as an inlet/outlet of air from the outside of them display device 1. The lamp cooling duct 200 as such forms a portion independent of other portions of the entire projection type display device 1. Other portions that form cooling means for an interior of the optical engine portion 6, though not shown, form a system independent of the lamp cooling duct 200.

Figure 4A:
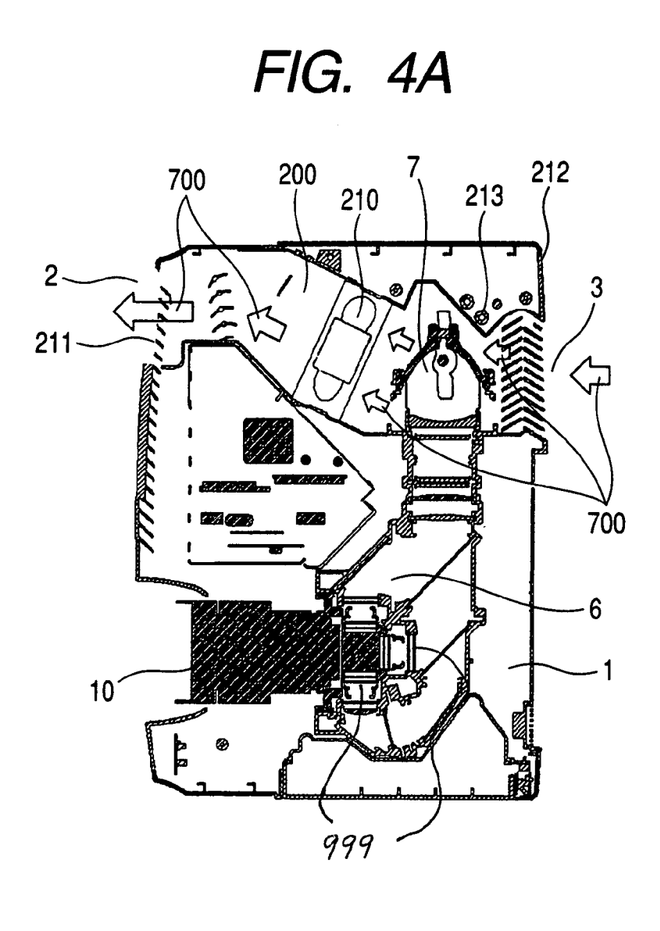
FIGS. 4A and 4B are cross-sectional views for explaining the direction of cooling air through the lamp cooling duct of the projection type display device according to the first embodiment of the present invention.
Figure 4B:
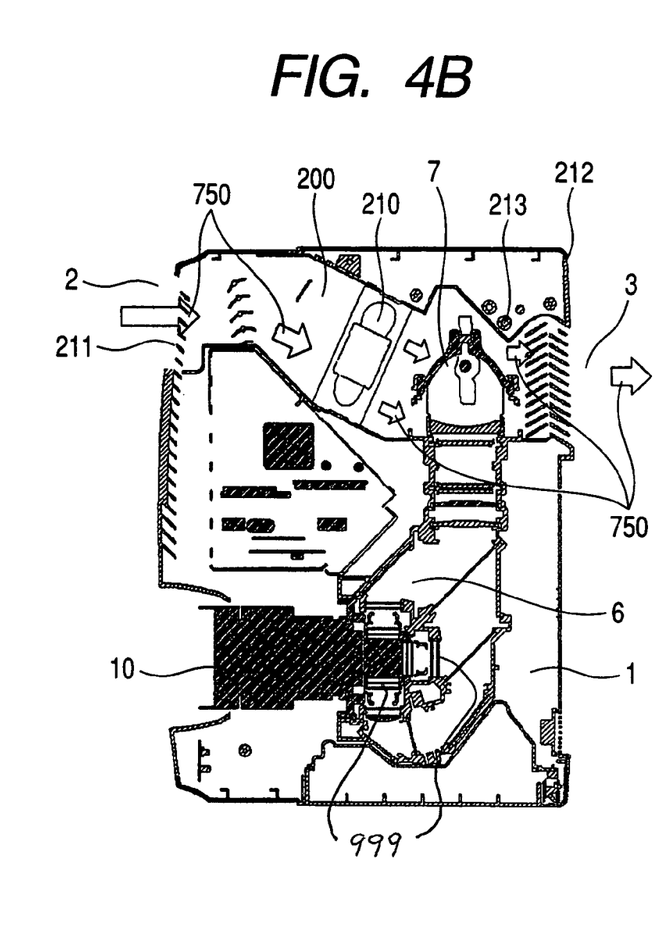

FIGS. 4A and 4B are cross-sectional views showing operating conditions of the projection type display device 1 shown in FIGS. 1A and 1B according to the first embodiment of the present invention. FIG. 4A shows the direction of the cooling air flowing in an operating condition of the display device 1, in which the air blowing direction of the fan 210 is set toward the front of the display device 1 (an image projecting direction). FIG. 4A specifically represents a condition, in which air is drawn in from the intake/exhaust port B 3 and exhausted through the intake/exhaust port A 2.

Referring to FIG. 4A, the fan 210 sends air toward the front of the display device 1. An outside air drawn in through the intake/exhaust port B 3 from the outside of the projection type display device 1 flows as shown by an arrow A 700. Specifically, the outside air travels through the duct intake/exhaust port B 212 of the lamp cooling duct 200 to reach the fan 210. During this period, heat exchange takes place so that heat generated by the lamp 7 of the lamp duct 213 transfers to the outside air. The air blown by the fan 210 then travels through the intake/exhaust duct U 215 and the intake/exhaust duct B 216 forming the intake/exhaust duct. The air is then exhausted through the duct intake/exhaust port A 211 and the intake/exhaust port A 2 out of the projection type display device 1.

FIG. 4B shows the direction of the cooling air flowing in an operating condition of the display device 1, in which the air blowing direction of the fan 210 is set toward the rear of the display device 1. FIG. 4B specifically represents a condition, in which air is drawn in from the intake/exhaust port A 2 and exhausted through the intake/exhaust port B 3.

Referring to FIG. 4B, the fan 210 sends air toward the rear of the display device 1. An outside air drawn in through the intake/exhaust port A 2 from the outside of the projection type display device 1 flows as shown by an arrow B 750. Specifically, the outside air travels from the duct intake/exhaust port A 211 through the intake/exhaust duct portion (the intake/exhaust duct U 215 and the intake/exhaust duct B 216) to reach the fan 210. The air blown off by the fan 210 is blown against the lamp 7 inside the lamp duct 213. Heat exchange then takes place so that heat generated by the lamp 7 transfers to the air. The air is further exhausted out of the projection type display device 1 by way of the duct intake/exhaust port B 212 and the intake/exhaust port B 3.

The conditions depicted in FIGS. 4A and 4B can be achieved by changing the blowing direction of the fan 210. Specifically, selecting the direction of rotation of the fan 210 between a forward direction and a backward direction allows the direction in which air flows through the lamp cooling duct 200 to be selected between a forward direction and a backward direction. Further, changing the blowing direction of the fan 210 as described in the foregoing allows the functions of the intake port and the exhaust port to be switched relative to the entire projection type display device 1. To be more precisely, in the condition as shown in FIG. 4A, air is drawn in through the intake/exhaust port B 3 and exhausted out of the display device 1 through the intake/exhaust port A 2. Conversely, in the condition as shown in FIG. 4B, air is drawn in through the intake/exhaust port A 2 and exhausted out of the display device 1 through the intake/exhaust port B 3. That is, either one of the following two conditions can be selected at one time. Specifically, the condition of the air being exhausted toward the front of the projection type display device 1, or the condition shown in FIG. 4A, or the condition of the air being exhausted toward the rear of the projection type display device 1, or the condition shown in FIG. 4B.

The range through which the cooling air travels on the side of the lamp cooling duct 200 is isolated from the range of other optical engine portion 6. This means that changing the blowing direction in the lamp cooling duct 200 does not affect cooling of the optical engine portion 6 and other portions within the projection type display device 1.

As is apparent from FIG. 2, and FIGS. 4A and 4B, the fan 210 is disposed at substantially a center of the lamp cooling duct 200. This helps keep noise produced from rotation of the fan to a low level.

Figure 5:
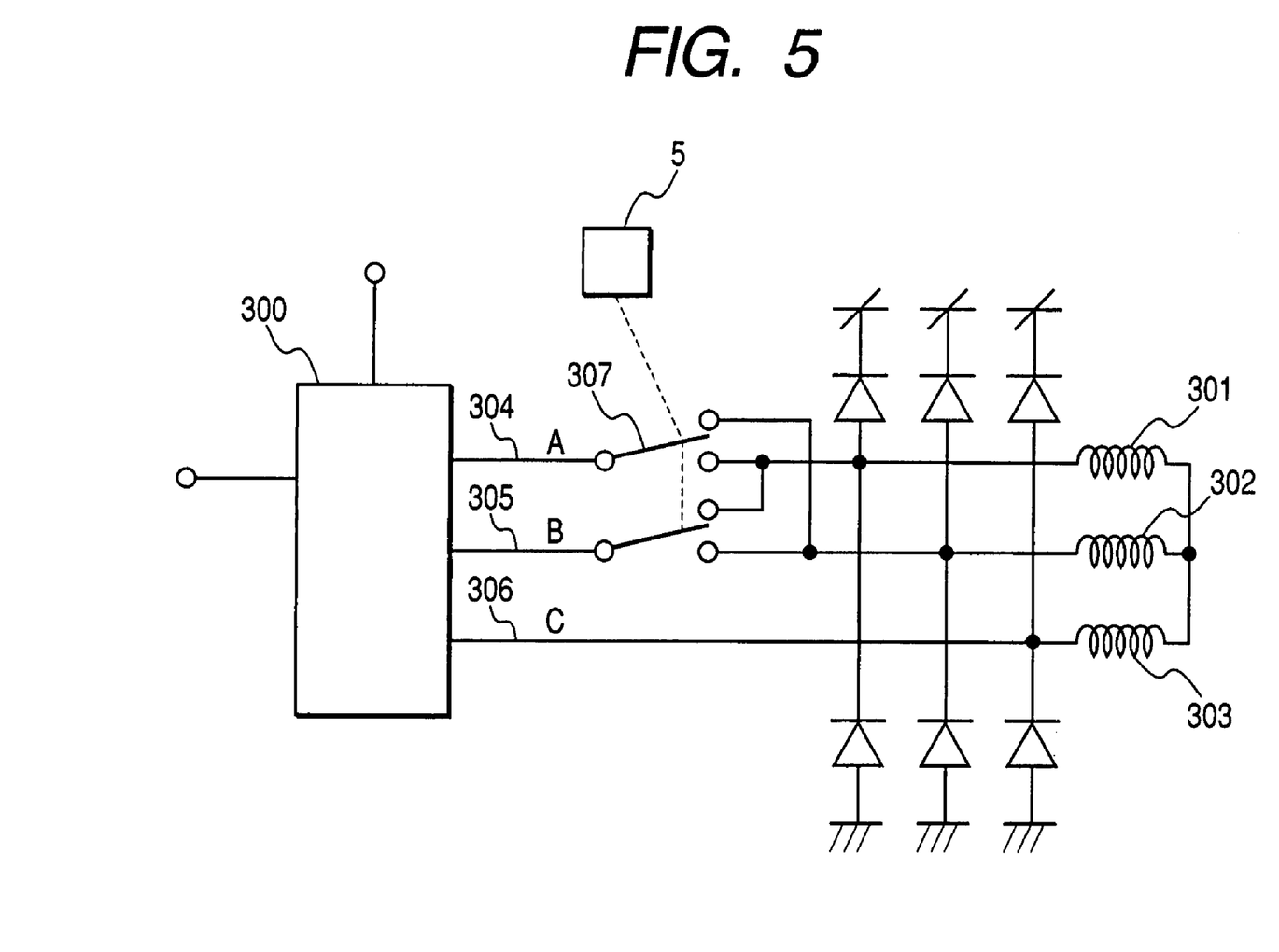
FIG. 5 is a block diagram showing a circuit for selecting the direction of rotation of a fan of the projection type display device according to the first embodiment of the present invention.

FIG. 5 is a block diagram showing a circuit for selecting the blowing direction of the fan 210, or the direction of rotation of the fan 210. Referring to FIG. 5, there are three fan motor driving coils having different phases from each other inside the fan. Current is fed sequentially to a coil A 301, a coil B 302, and a coil C 303, thus driving the fan. The direction of rotation of the fan can be changed by exchanging two out of driving lines output from a motor control IC 300. The three driving lines are a phase A line 304, a phase B line 305, and a phase C line 306. If, for example, a switch 307 is used to exchange phase A and phase B, it can change the direction of rotation of the fan. The switch 307 is operatively connected to the operation switch 5 provided on the outside of the projection type display device 1. The switch 307 thus allows the driving phases of the fan motor to be exchanged from the outside of the display device 1. This arrangement permits the following operation. Specifically, operating the operation switch 5 provided on the outside of the display device 1 actuates the switch 307. This in turn exchanges the driving phases A and B of the motor. Then, the driving phase of the fan motor is changed to switch the direction of rotation of the fan motor.

As described in the foregoing, the intake and exhaust directions of the lamp cooling duct can be switched by changing the direction of rotation of the fan motor.

It is, in this manner, possible to change the intake and exhaust directions relative to the lamp in the entire projection type display device 1 by operating the operation switch 5 provided on the outside of the projection type display device 1.

Referring back to FIGS. 1A and 1B, the operation of the entire projection type display device 1 will be described. Referring to FIGS. 1A and 1B, assume that the operation switch 5 provided on the outside of the projection type display device 1 is operated; for example, the switch is placed in a "forward rotation" position. This switch operation causes the internal fan to rotate in the forward direction and the air is blown in the direction of the arrow A 700 shown in FIG. 4A. During this time, the outside air drawn in from the side of the intake/exhaust port B 3 cools down the lamp inside. The air is then exhausted from the intake/exhaust port A 2. That is, the air is exhausted to the forward in the same direction as the projecting direction of the projection type display device 1.

Assume this time that the operation switch 5 provided on the outside of the projection type display device 1 is operated; for example, the switch is placed in a "backward rotation" position. This switch operation causes the internal fan to rotate in the backward direction and the air is blown in the direction of the arrow B 750 shown in FIG. 4B. During this time, the outside air drawn in from the side of the intake/exhaust port A 2 cools down the lamp inside. The air is then exhausted from the intake/exhaust port B 3. That is, the air is drawn in from the forward direction of the projecting direction of the projection type display device 1 and exhausted toward the rear.

The preferred embodiment of the present invention as described in the foregoing allows the intake/exhaust port direction to be appropriately changed according to the environment at the installation site of the projection type display device. The preferred embodiment of the present invention can reduce the amount of exhaust air being diverted toward the intake port side, since the intake port and the exhaust port are provided on either of the two opposing faces of the casing of the display device.

In the projection type display device according to the first preferred embodiment of the present invention as described in the foregoing, the lamp as the illuminating means is provided in the air passageway formed by the lamp cooling duct so as to be cooled by the cooling air from the fan. It goes without saying that the part to be cooled is not limited to the lamp. Rather, part of the illuminating optical system, such as an optical filter, an optical lens, and the like disposed near the lamp, may also be subjected to cooling.

Figure 6A:
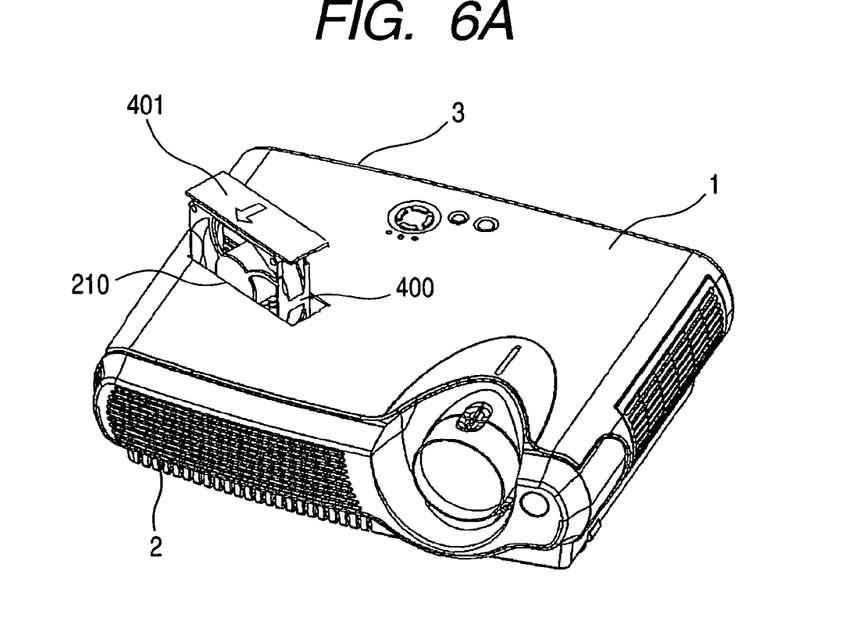
FIGS. 6A and 6B are perspective views of external representations of a projection type display device according to a second embodiment of the present invention.
Figure 6B:
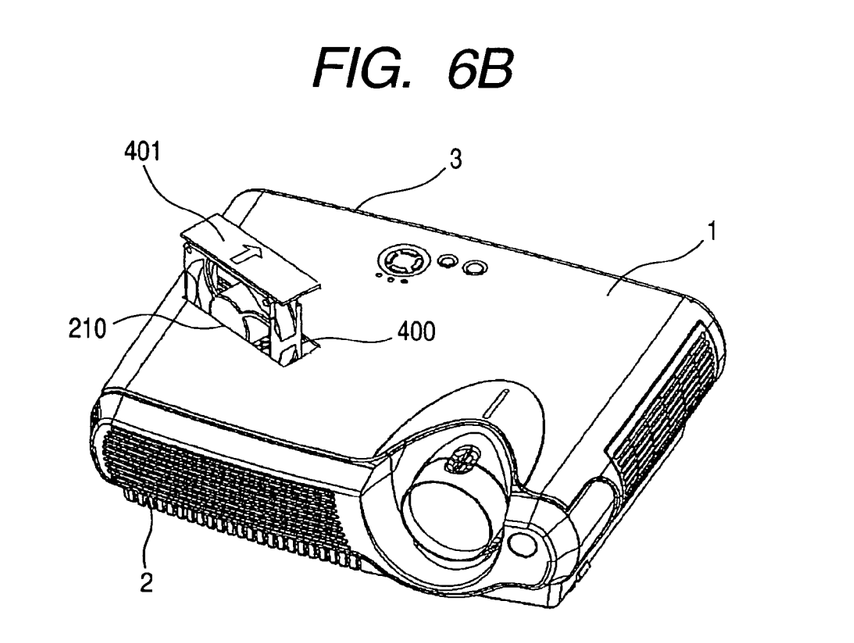

FIGS. 6A and 6B are perspective views of a projection type display device according to a second embodiment of the present invention. The projection type display device according to the first embodiment of the present invention uses the operation switch for changing the direction of rotation of the fan, thereby selecting the appropriate blowing direction. In the projection type display device according to the second embodiment of the present invention, on the other hand, the fan is made to be removable and mounted as necessary in an orientation to reverse the direction of rotation, thereby changing the blowing direction.

Referring to FIGS. 6A and 6B, there is provided a fan removal port 400 in a top surface of a projection type display device 1. A fan 210 can be removed from an inside of the projection type display device 1 by opening a fan lid 401. FIG. 6A shows a condition, in which the fan 210 rotates to blow air in a "forward" direction. For the sake of explanation, FIG. 6A shows where the fan 210 is being removed with the fan lid 401 opened. In actual operation, however, the projection type display device 1 is operated with the fan 210 mounted therein and the fan lid 401 closed in position. In the condition shown in FIG. 6A, the side of an intake/exhaust port A 2 of the projection type display device 1 serves as an exhaust port of the air that has cooled the lamp.

FIG. 6B shows a condition, in which the fan 210 rotates to blow air in a "backward" direction. For the sake of explanation, FIG. 6B shows where the fan 210 is being removed with the fan lid 401 opened. In actual operation, however, the projection type display device 1 is operated with the fan 210 mounted therein and the fan lid 401 closed in position. In the condition shown in FIG. 6B, the side of an intake/exhaust port B 3 of the projection type display device 1 serves as an exhaust port of the air that has cooled the lamp.

The intake and exhaust directions can also be exchanged, as described in the foregoing, by providing an arrangement, in which the direction of the cooling air is changed by changing the mounting direction of the cooling fan.

Figure 7A:
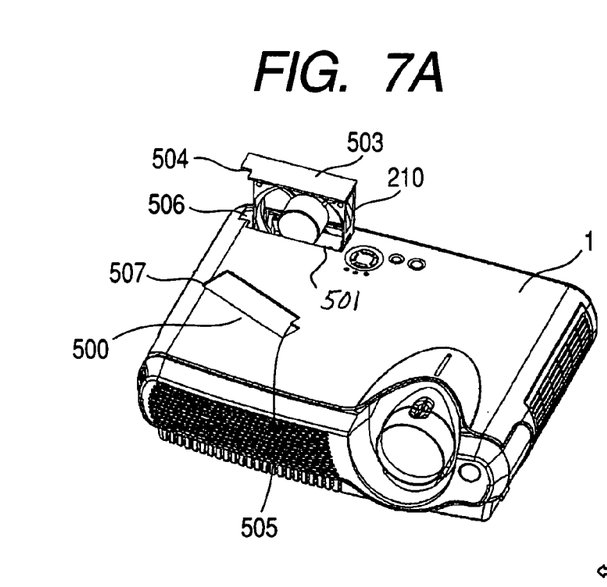
FIGS. 7A, 7B, and 7C are perspective views for explaining a fan changing system of a projection type display device according to a third embodiment of the present invention.
Figure 7B:
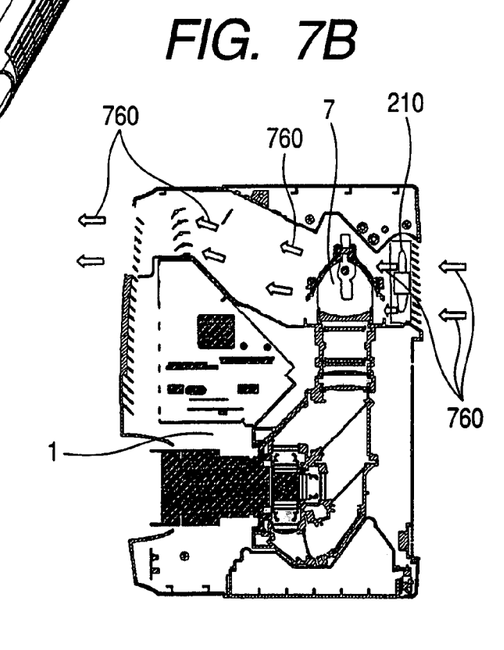
Figure 7C:
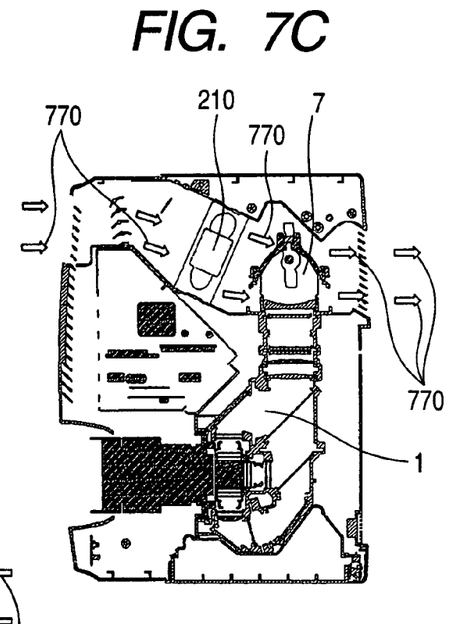

FIGS. 7A, 7B, and 7C are perspective views showing a projection type display device according to a third embodiment of the present invention. The projection type display device according to the third embodiment of the present invention is characterized in the following point. Specifically, the projection type display device is provided with a plurality of mounting locations for the fan (there are two mounting locations according to the third embodiment). Each of the mounting locations includes means of identifying the insertion direction (a cutout and a protrusion according to the third embodiment) for designating the direction of rotation of the fan. The blowing direction can thus be changed by changing the mounting location of a single fan.

Referring to FIG. 7A, the projection type display device 1 according to the third embodiment of the present invention includes two fan mounting portions in a top surface thereof: a fan mounting portion A 500 and a fan mounting portion B 501.

A fan 210 is mounted on a fan mounting lid 503 and the two can be handled as one integrated body. A direction identifying cutout 504 is provided in the fan mounting lid 503. The direction identifying cutout 504 restricts the mounting direction of the fan 210 when the fan mounting lid 503 is mounted in the projection type display device 1. As shown in FIG. 7A, the fan mounting portion A 500 includes a protrusion A 505. The fan mounting portion B 501, on the other hand, includes a protrusion B 506. When the fan 210 is mounted in either of these fan mounting portions A and B, the fan 210 can be mounted only in a direction, in which the corresponding protrusion fits in the direction identifying cutout 504 provided in the fan mounting lid 503. According to the arrangement shown in FIG. 7A, the fan 210 can be mounted in a direction inverted to each other between the fan mounting portion A 500 and the fan mounting portion B 501.

A lid 507 can be fitted in, and close, an opening portion that is otherwise left open when the fan 210 is mounted in the relevant mounting portion.

FIG. 7B shows an arrow 760 indicating the direction of cooling air flow when the fan 210 is mounted in the fan mounting portion B 501. To be more specific, the air blown off the fan 210 in a lamp cooling duct 200 cools an area around a lamp 7 and is exhausted in a projecting direction of the projection type display device 1, or the forward direction.

FIG. 7C shows an arrow 770 indicating the direction of cooling air flow when the fan 210 is mounted in the fan mounting portion A 500. To be more specific, the air blown off the fan 210 in the lamp cooling duct 200 cools the area around the lamp 7 and is exhausted in a direction opposite to the projecting direction of the projection type display device 1, or the backward direction.

The embodiment as shown in FIGS. 7A, 7B, and 7C, the setting of forward or backward exhausting from the projection type display device 1 can be achieved by changing the mounting location of the fan. The embodiment also ensures an efficient heat exchange since the lamp is cooled at all times by the air blowing against the same.

Figure 8:
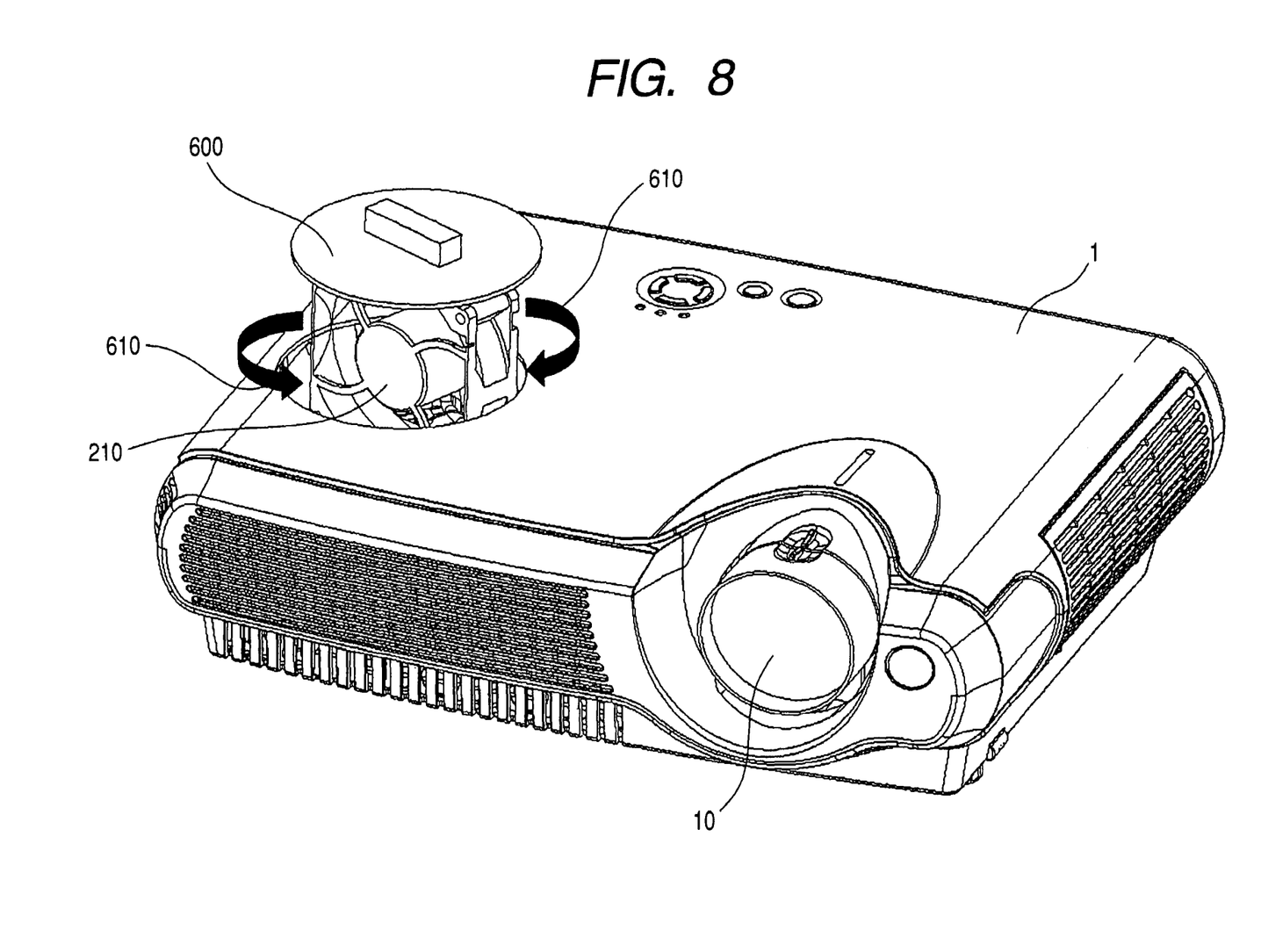
FIG. 8 is a view for explaining changing of a cooling air around a lamp cooling duct of a projection type display device according to a fourth embodiment of the present invention.

FIG. 8 is a perspective view showing a projection type display device according to a fourth embodiment of the present invention. The projection type display device according to the fourth embodiment of the present invention provides an arrangement, by which the fan is rotatably turned around to change the blowing direction.

Referring to FIG. 8, a fan 210 is mounted in a rotary portion 600 provided inside a lamp cooling duct 200 inside the projection type display device 1. The blowing direction of the fan 210 can be changed by rotating the rotary portion 600 as shown by an arrow 610. The intake and exhaust directions of the projection type display device 1 can also be changed according to this arrangement.

In accordance with the first embodiment of the present invention, the switch is used to exchange the three-phase driving lines for selecting the direction of rotation (blowing direction) of the fan. It goes without saying that the same effect can be achieved from an arrangement that performs electric switching operations, including one that changes the phase of the driving waveform and one that changes the polarity of current. In addition to the type that changes the direction of rotation of the fan, a variable pitch propeller system may be used to exchange the exhaust port for the intake port of the cooling air depending on the operating environment of the display device. In the variable pitch propeller system, the angle of the fan blade is varied as means of changing the blowing direction of the fan.

In describing the preferred embodiments of the present invention, the intake and exhaust directions are described as they are selected between the forward and rearward directions with the projecting direction of the projection type display device being defined as forward and the direction opposite thereto being defined as rearward. It goes without saying that the same effect can be obtained from a combination of a right side face and a left side face, a front face and a side face, a top face and a front side, or the like.

In the projection type display device according to the preferred embodiments of the present invention described in the foregoing, liquid crystal is used for the light valve means. Other light valve means may still be used, such as a micro-mirror driving system, a laser address liquid crystal system, and the like. Regardless of whether it is a transmission type or a reflection type, the light valve means of any of these types serves the purpose as long as the means is capable of projecting light as an image by modulating an incident light. Furthermore, the same effect can also be realized from a type using three light valves, two light valves, or one light valve.

As described in the foregoing, the projection type display device according to the preferred embodiments of the present invention is capable of exchanging the exhaust port of the cooling air for the intake port of the cooling air according to the operating environment of the projection type display device. The projection type display device thus achieves the best possible operating conditions to meet the operating environment.

The present invention can therefore provide the projection type display device offering an enhanced ease of use.

What is claimed is:

1. A projection type display device, comprising:
   a light source unit;
   a cooling fan which cools said light source unit;
   a light valve which modulates light emanating from said light source unit;
   a projection lens which projects light modulated by said light valve;
   a casing having a first inlet/outlet face and a second inlet/outlet face; and
   a duct coupled between said first inlet/outlet face and said second inlet/outlet face, said cooling fan disposed within said duct at least a portion of said light source unit disposed in said duct, an airflow within said duct being substantially restricted within said duct,
   wherein the cooling fan provides a cooling air separated from the light valve to cool only the light source unit, and a cooling air path direction is selectively varied.

2. The projection type display device according to claim 1, wherein the direction of said cooling air is selectively varied by changing a direction of rotation of said cooling fan between forward and backward.

3. The projection type display device according to claim 1, wherein said cooling fan is rotatable and the direction of said cooling air is selectively varied by varying the rotation of said cooling fan.

4. The projection type display device according to claim 1, wherein said cooling fan is provided at substantially a center portion of a casing of said projection type display device.

5. The projection type display device according to claim 1, wherein a plurality of cooling fan removal locations are provided in said cooling air path and the direction of said cooling air is selectively varied by selecting a specific cooling fan removal location and mounting therein said cooling fan.

6. The projection type display device according to claim 5, wherein said cooling fan is mounted so that said cooling air is blown against said light source unit.

7. The projection type display device according to claim 2, wherein said cooling fan is provided at substantially a center portion of said casing.

8. The projection type display device according to claim 3, wherein said cooling fan is provided at substantially a center portion of said casing.

* * * * *